United States Patent
Wu et al.

(10) Patent No.: US 9,835,276 B2
(45) Date of Patent: Dec. 5, 2017

(54) QUICK-SEAL CONNECTING COMPONENT

(71) Applicant: Feiyu Li, Xiamen, Fujian (CN)

(72) Inventors: Aimin Wu, Xiamen (CN); Haitao Xu, Xiamen (CN)

(73) Assignee: XIAMEN AXENT CORPORATION LIMITED, Xiamen (CN)

( * ) Notice: Subject to any disclaimer, the term of this patent is extended or adjusted under 35 U.S.C. 154(b) by 110 days.

(21) Appl. No.: 14/439,871

(22) PCT Filed: Sep. 11, 2013

(86) PCT No.: PCT/CN2013/083337
§ 371 (c)(1),
(2) Date: Apr. 30, 2015

(87) PCT Pub. No.: WO2014/067352
PCT Pub. Date: May 8, 2014

(65) Prior Publication Data
US 2015/0260319 A1    Sep. 17, 2015

(30) Foreign Application Priority Data

Oct. 31, 2012  (CN) .......................... 2012 1 0432304
Oct. 31, 2012  (CN) ...................... 2012 2 0572951 U

(51) Int. Cl.
*F16L 21/02*    (2006.01)
*E03D 11/14*    (2006.01)
(Continued)

(52) U.S. Cl.
CPC .............. *F16L 21/02* (2013.01); *E03D 11/14* (2013.01); *E03D 11/17* (2013.01); *F16L 15/04* (2013.01);
(Continued)

(58) Field of Classification Search
CPC ........ E03D 11/17; E03D 11/14; F16L 41/088; F16L 41/16
USPC ....... 285/139.2, 139.3, 140.1, 141.1, 193, 8, 285/9.2, 137.11, 239, 201–204, 232, 285/235–237, 20, 200, 212, 382.4, 107, 285/109, 216, 217; 403/290; 16/2.1–2.5
See application file for complete search history.

(56) References Cited

U.S. PATENT DOCUMENTS 2,132,636 A * 10/1938 Maahs .................. F16L 41/088
                                                  285/216
2,257,385 A    9/1941 Keegan
(Continued)

FOREIGN PATENT DOCUMENTS

CN    202252516 U    5/2012
CN    102587473 A    7/2012
(Continued)

*Primary Examiner* — David E Bochna
(74) *Attorney, Agent, or Firm* — Rabin & Berdo, P.C.

(57) ABSTRACT

A quick-seal connecting component includes a first sealing ring, an expansion pipe and pipe joint with front and rear running through; the joint is assembled to a pipe in sealing engagement by the first sealing ring and the expansion pipe. The expansion pipe is sleeved on the outer wall of the pipe type joint. The first sealing ring is sleeved on the outer wall of the expansion pipe. The pipe type joint of the connecting component is assembled to the toilet pipe by the first sealing ring, the expansion pipe and the second sealing ring.

10 Claims, 7 Drawing Sheets

(51) Int. Cl.
  *E03D 11/17*    (2006.01)
  *F16L 15/04*    (2006.01)
  *F16L 37/08*    (2006.01)
  *F16L 41/08*    (2006.01)
  *F16L 41/16*    (2006.01)

(52) U.S. Cl.
  CPC ............. *F16L 37/08* (2013.01); *F16L 41/088* (2013.01); *F16L 41/16* (2013.01)

(56) References Cited

U.S. PATENT DOCUMENTS

| | | | |
|---|---|---|---|
| 2,450,173 A | 9/1948 | Uhri | |
| 2,697,619 A * | 12/1954 | Kennedy | F16L 37/008 |
| | | | 285/216 |
| 2,770,476 A | 11/1956 | Cleverly | |
| 3,096,678 A * | 7/1963 | Devine | B25B 13/48 |
| | | | 285/140.1 |
| 3,424,481 A * | 1/1969 | Fulghum | B65D 39/086 |
| | | | 285/140.1 |
| 3,568,977 A * | 3/1971 | Nelson | F16K 15/148 |
| | | | 285/140.1 |
| 3,879,065 A * | 4/1975 | Kobayashi | E03D 11/17 |
| | | | 285/140.1 |
| 3,953,555 A * | 4/1976 | Gley | B01F 3/0412 |
| | | | 285/140.1 |
| 4,094,358 A * | 6/1978 | Neveux | F01P 11/08 |
| | | | 285/140.1 |
| 4,451,069 A * | 5/1984 | Melone | F16L 37/0842 |
| | | | 285/315 |
| 5,353,445 A * | 10/1994 | Denzin | E03D 1/30 |
| | | | 285/140.1 |
| 6,179,340 B1 * | 1/2001 | Adolf | F16L 25/0036 |
| | | | 285/140.1 |
| 6,511,099 B2 * | 1/2003 | Bartholoma | F16L 5/06 |
| | | | 285/140.1 |
| 6,722,704 B2 * | 4/2004 | Bartholoma | H02G 15/04 |
| | | | 285/140.1 |
| 6,883,538 B2 * | 4/2005 | Toyokawa | F16L 41/088 |
| | | | 285/140.1 |
| 7,032,933 B2 * | 4/2006 | Hellman | F16L 25/14 |
| | | | 285/105 |
| 7,128,346 B2 * | 10/2006 | Miyajima | B60K 15/035 |
| | | | 285/204 |
| 7,862,090 B1 * | 1/2011 | Foreman | F16L 37/008 |
| | | | 285/148.27 |
| 2002/0130515 A1 * | 9/2002 | Mlyajima | B29C 65/565 |
| | | | 285/202 |
| 2007/0267869 A1 * | 11/2007 | Patel | F16L 19/005 |
| | | | 285/386 |

FOREIGN PATENT DOCUMENTS

| | | |
|---|---|---|
| CN | 202466751 U | 10/2012 |
| CN | 202831138 U | 3/2013 |
| CN | 202831168 U | 3/2013 |
| GB | 1227975 A | 4/1971 |

* cited by examiner

QUICK-SEAL CONNECTING COMPONENT

FIELD OF THE INVENTION

The present invention relates to seal connecting of toilet pipe, especially to a quick-seal connecting component.

BACKGROUND OF THE INVENTION

As functional needs, internal waterways and airways of some products need sealing and separating to prevent water or air leakage.

For example, a high-class toilet needs the pressure water of the whole pipe not to leak to the outside of the pipe when water runs through, so that the water flexible pipe and the ceramic support have to seal therebetween. As the spraying water flexible pipe and the ceramic support are difficult to seal, plastic or metal component is used in existing known technology to connect. One end of this component is connected to the spraying water flexible pipe in sealing engagement, the other end is connected to the ceramic support. The connection of the ceramic support and the component is hard direct connection, as there is pressure water running through, the connection of the ceramic support and the joint can not leak. However, as there are many accessories in the toilet, it lefts small space to the sealing accessory, usual lock sealing method (using a nut to lock the sealing pad) is not applicable here, it does not left enough space for a spanner to assembly neither, thus making the disassembly uneasily.

Patents with application number 201220041506.3 and 201210025960.4 in the Chinese patent database disclose a water-saving siphon toilet. Air can not enter the space of the main waterway (spraying waterway) assembled with the check valve from the outside in this siphon toilet. If air enters the space of the spraying waterway assembled with the check valve, it may cause functional failure or imperfect. To realize above function and quick-assembly and maintenance, it needs the check valve to efficiently seal the waterway to prevent air entering the spraying waterway. The check valve component is assembled to the main waterway of the toilet, the space is small that it is not benefit for quick assembly and disassembly.

SUMMARY OF THE INVENTION

The object of the present invention is to overcome the disadvantages of the existing known technology and to provide a quick-seal connecting component.

The technical proposal of the present invention is that:
A quick-seal connecting component, comprising:
a first sealing ring;
an expansion pipe; and
a pipe type joint with front and rear running throughout;
the joint is assembled to a pipe in sealing engagement by the first sealing ring and the expansion pipe, the expansion pipe is sleeved on the outer wall of the pipe type joint, the first sealing ring is sleeved on the outer wall of the expansion pipe.

In another preferred embodiment, a second sealing ring is further sleeved between the expansion pipe and the pipe type joint.

In another preferred embodiment, the largest external diameter of the part of the expansion pipe sleeved on the first sealing ring is larger than the smallest internal diameter of the first sealing ring.

In another preferred embodiment, the outer wall of the pipe type joint is disposed with male thread, the inner wall of the expansion pipe is disposed with female thread that is coupled to the male thread of the outer wall of the pipe type joint.

In another preferred embodiment, the pipe type joint is disposed with radial outward protruding, the inner wall of the expansion pipe is disposed with a lock groove coupled to the protruding.

In another preferred embodiment, it further comprises a pressing ring, the expansion pipe is sleeved on the outer wall of the pressing ring.

In another preferred embodiment, a second sealing ring is disposed and sleeved between the expansion pipe and the pipe type joint.

In another preferred embodiment, the largest external diameter of the part of the expansion pipe sleeved on the first sealing ring is larger than the smallest internal diameter of the first sealing ring.

In another preferred embodiment, the outer wall of the pipe type joint is disposed with male thread, the inner wall of the expansion pipe is disposed with female thread that is coupled to the male thread of the outer wall of the pipe type joint.

In another preferred embodiment, the pipe type joint is disposed with an inclined surface, the head end of the expansion pipe is disposed with a guiding surface to guide the inclined surface of the pipe type joint.

The present invention has advantages as follows:
1. The pipe type joint of the connecting component of the present invention is assembled to the toilet pipe by the first sealing ring, the expansion pipe and the second sealing ring, so that it can realize quick-assembly of seal structure in a small space, the present invention has high efficiency and well sealing effect.
2. The joint, the sealing rings and the expansion pipe of the present invention are easily assembled and maintained.
3. The present invention has simple structure, easy operation and low cost.

DETAILED DESCRIPTION OF THE EMBODIMENTS

The present invention will be further described with the drawings and the embodiments.

The First Embodiment

Figure 1:
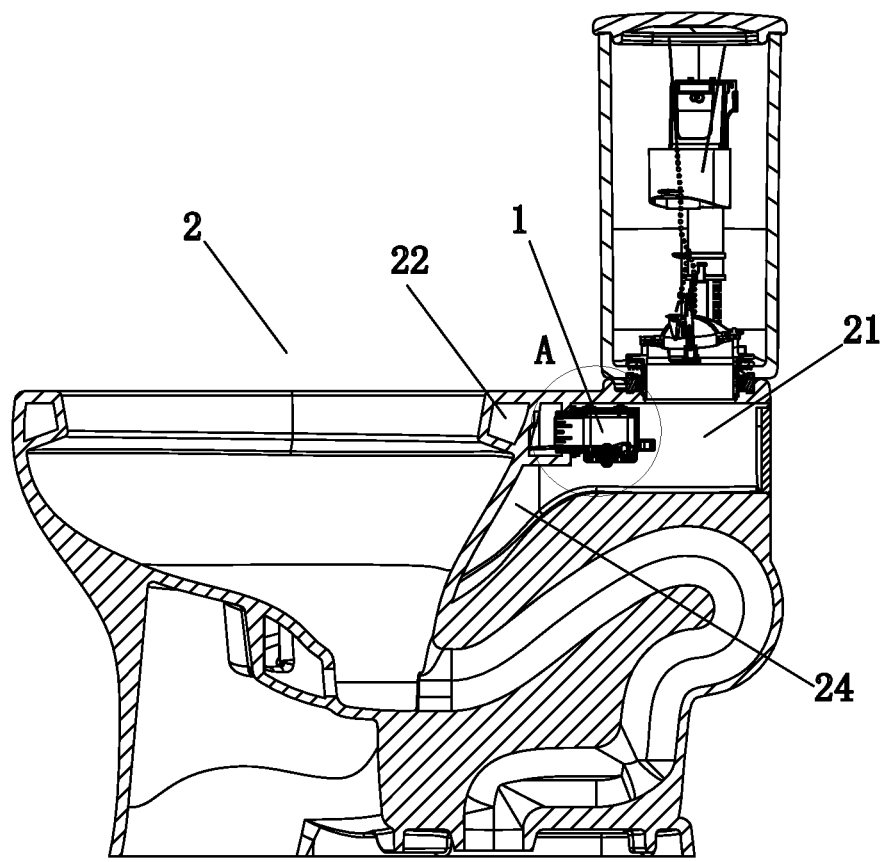
FIG. 1 illustrates a sectional diagram of the assembly structure of a first embodiment of the present invention.
Figure 2:
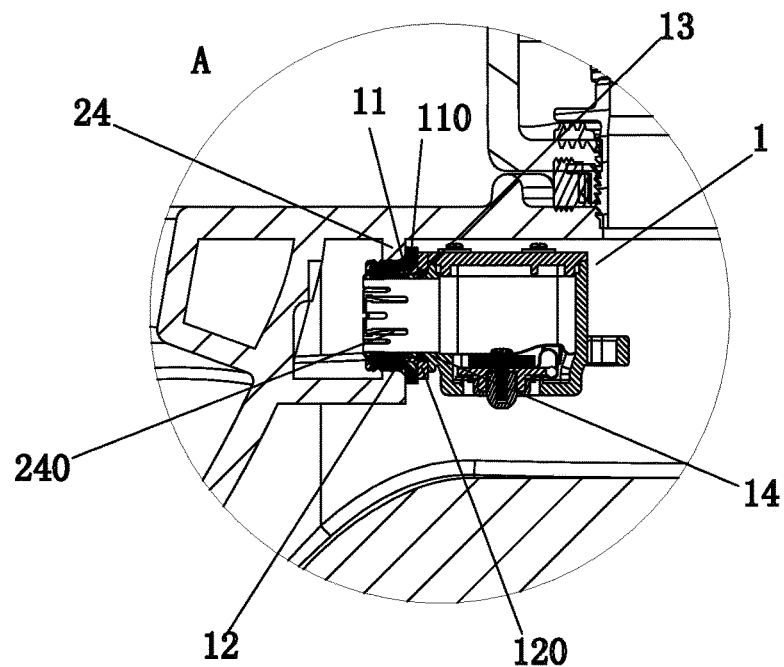
FIG. 2 illustrates an enlargement diagram of A of FIG. 1.
Figure 3:
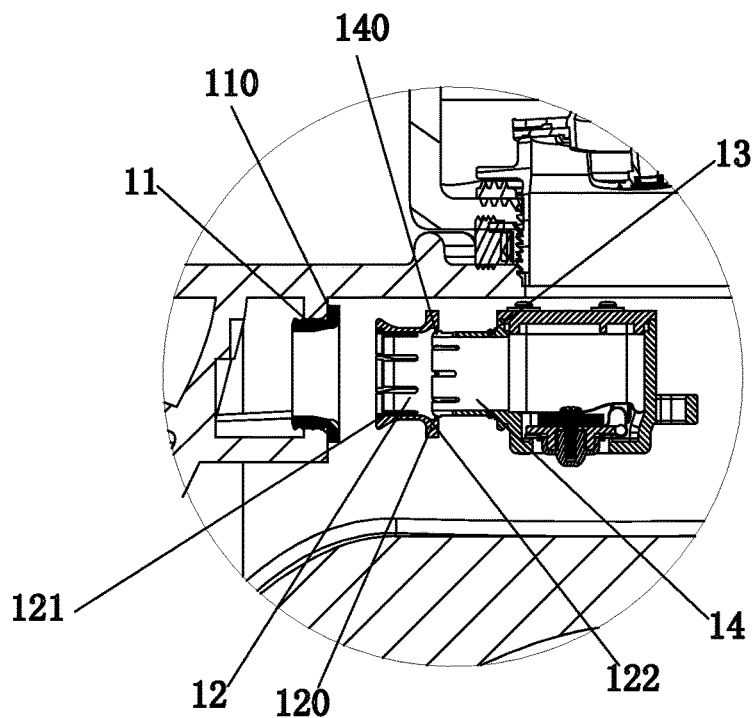
FIG. 3 illustrates a sectional diagram of the decomposed structure of the first embodiment of the present invention.

Referring to FIGS. 1-3, this embodiment is used to separate the main waterway of the toilet and the outside air.

In the toilet 2 of FIG. 1, when the drain valve is closed, the outside air can not enter the main waterway 21 from the hole of the flushing surface and the vortex waterway, so that water of the spraying waterway 23 and the main waterway 21 is kept for quick siphon of next draining. A check valve to separate the main waterway 21 and the vortex waterway 22 is disposed at a hole 240 of a separating wall 24 of the main waterway 21 and the vortex waterway 22 of the toilet 2.

The quick-seal connecting component 1 of this embodiment comprises a first sealing ring 11, an expansion pipe 12, a second sealing ring 13 and a pipe type joint 14 with front and rear running throughout, the pipe type joint 14 of this embodiment is the outlet pipe 14 of the check valve; the first sealing ring 11 is cylindrical sealing ring, the head end is disposed with a radial outward sealing protruding 110; the head end of the expansion pipe 12 is disposed with a radial outward expansion protruding 120.

The outlet pipe 14 of the check valve is assembled to the hole 240 of the separating wall 24 by the first sealing ring 11, the expansion pipe 12 and the second sealing ring 13, the expansion pipe 12 is sleeved on the outer wall of the outlet pipe 14, the first sealing ring 11 is sleeved on the outer wall of the expansion pipe 12, the second sealing ring 13 is sleeved between the expansion pipe 12 and the outlet pipe 14. Therein, the largest external diameter of the part of the first sealing ring 11 sleeved on the hole 240 of the separating wall 24 is larger than the internal diameter of the hole 240 of the separating wall 24; the largest external diameter of the part of the expansion pipe 12 sleeved on the sealing ring is larger than the smallest internal diameter of the first sealing ring 11; the end of the outlet pipe 14 is configured with a radial outward protruding 140, the end of the inner wall of the expansion pipe 12 is configured with a lock groove 121 coupled to the protruding 140, the head end of the expansion pipe 12 is disposed with a guiding surface 122 to guide the protruding.

The first sealing ring 11 is slightly interference fitted to the hole 240 of the separating wall 24 after assembled to the hole 240 of the separating wall 24. The expansion pipe 12 is sleeved in, so that the first sealing ring 11 is radially expanded and then compressed. The outlet pipe 14 is then pressed, the protruding 140 of the outlet pipe 14 pushes the guiding surface 122 of the expansion pipe 12 so that the expansion pipe 12 is expanded outwardly, and the first sealing ring 11 is then radially expanded and pressed on the wall of the opening 240 of the separating wall 24 of the toilet, forming a radial upward sealing engagement.

The expansion pipe 12 is radially expanded, the equivalent diameter thereof coupled to the first sealing ring 11 is larger than the external diameter of the hole 240 of the separating wall 24, so that the expansion pipe can not get off the separating wall 24. the first sealing ring 11 is radially expanded, the sealing protruding 110 thereof is pressed by the expansion protruding 120 and then pressed on the separating wall 24, forming a edge sealing engagement to the edge of the hole 240 of the separating wall 24.

When the protruding of the outlet pipe 14 is locked to the lock groove 121 of the expansion pipe 12, the outlet pipe 14 can not easily get off, so that the expansion pipe 12 is kept in radially expanding condition (the equivalent diameter of the expanding expansion pipe 12 assembled to the first sealing ring is larger than the diameter of the hole 240 of the separating wall 24 of the toilet 2) that it can not get off the separating wall 24. Meanwhile, the sealing protruding 110 of the first sealing ring 11 is pressed, forming an end face sealing engagement with the expansion protruding 120 of the expansion pipe 12 to the separating wall 24 and the outlet pipe 14.

With above mentioned three sealing engagements, the quick-sealing connecting component 1 and the separating wall form a well sealing, so that the main waterway 21 of the toilet is separated from the vortex waterway 22 in non-draining condition. Meanwhile, the second sealing ring 13 is configured between the expansion pipe 12 and the joint for sealing engagement. In non-draining condition, with the sealing sheet of the check valve for self sealing and separating, outside air can not enter the main waterway 21 when the toilet 2 is in non-draining condition.

To maintain above component, it only needs to pull the check valve hard, the protruding 140 of the outlet pipe 14 shrinks inwardly and gets off the lock groove 121, so that the check valve can be easily taken out.

The Second Embodiment

Figure 4:
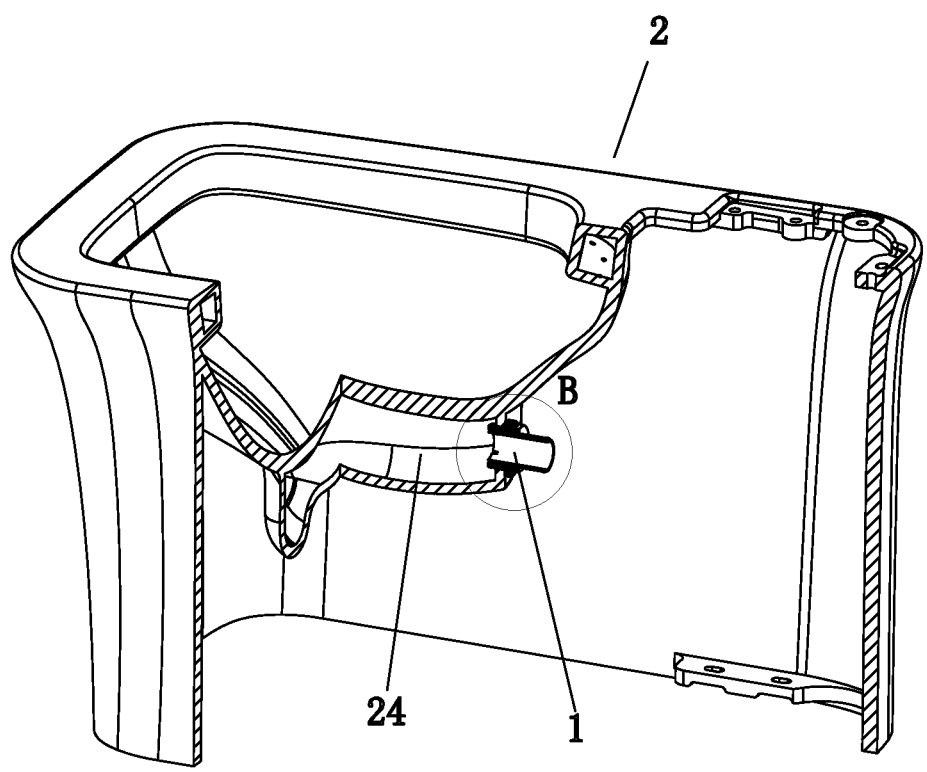
FIG. 4 illustrates a sectional diagram of the assembly structure of a second embodiment of the present invention.
Figure 5:
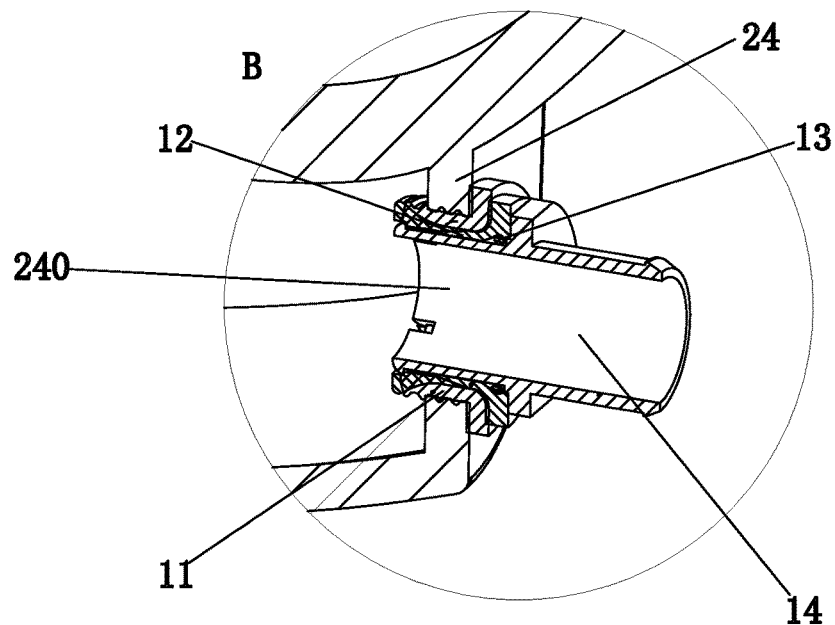
FIG. 5 illustrates an enlargement diagram of B of FIG. 4.
Figure 6:
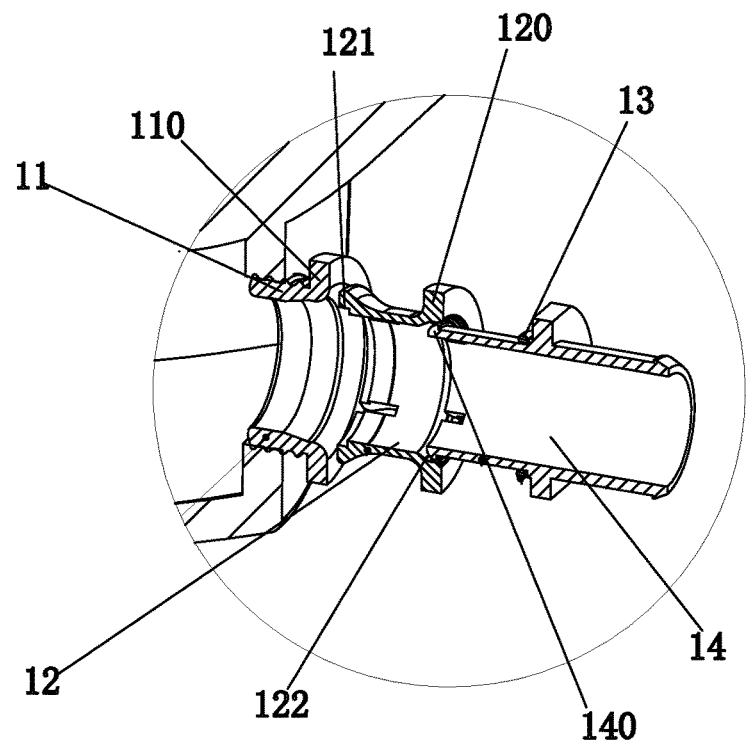
FIG. 6 illustrates a sectional diagram of the decomposed structure of the second embodiment of the present invention.

Referring to FIGS. 4-6, this embodiment needs that the main waterway from the water source of the toilet 2 through the spraying waterway 23 to the spraying rear will not leak when pressure water gets through. The quick-seal connecting component is assembled to the hole 240 of the separating wall 24 of the spraying waterway 23 of the toilet 2.

The quick-seal connecting component 1 of this embodiment comprises a first sealing ring 11, an expansion pipe 12, a second sealing ring 13 and a pipe type joint 14 with front and rear running throughout. The first sealing ring 11 is cylindrical sealing ring, the head end is disposed with a radial outward sealing protruding 110; the head end of the expansion pipe 12 is disposed with a radial outward expansion protruding 120.

The outlet pipe 14 of the check valve is assembled to the hole 240 of the separating wall 24 by the first sealing ring 11, the expansion pipe 12 and the second sealing ring 13, the expansion pipe 12 is sleeved on the outer wall of the outlet pipe 14, the first sealing ring 11 is sleeved on the outer wall of the expansion pipe 12, the second sealing ring 13 is sleeved between the expansion pipe 12 and the outlet pipe 14. Therein, the largest external diameter of the part of the first sealing ring 11 sleeved on the hole 240 of the separating wall 24 is larger than the internal diameter of the hole 240 of the separating wall 24; the largest external diameter of the part of the expansion pipe 12 sleeved on the sealing ring is larger than the smallest internal diameter of the first sealing ring 11; the end of the outlet pipe 14 is configured with a radial outward protruding 140, the end of the inner wall of the expansion pipe 12 is configured with a lock groove 121 coupled to the protruding 140, the head end of the expansion pipe 12 is disposed with a guiding surface 122 to guide the protruding 140.

The first sealing ring 11 is slightly interference fitted to the hole 240 of the separating wall 24 after assembled to the hole 240 of the separating wall 24. The expansion pipe 12 is sleeved in, so that the first sealing ring 11 is radially expanded and then compressed. The outlet pipe 14 is then pressed, the protruding 140 of the outlet pipe 14 pushes the guiding surface 122 of the expansion pipe 12 so that the expansion pipe 12 is expanded outwardly, and the first sealing ring 11 is then radially expanded and pressed on the wall of the opening 240 of the separating wall 24 of the toilet, forming a radial sealing engagement.

The expansion pipe 12 is radially expanded, the equivalent diameter thereof coupled to the first sealing ring 11 is larger than the external diameter of the hole 240 of the separating wall 24, so that the expansion pipe can not get off the separating wall 24. the first sealing ring 11 is radially expanded, the sealing protruding 110 thereof is pressed by the expansion protruding 120 and then pressed on the separating wall 24, forming a edge sealing engagement to the edge of the hole 240 of the separating wall 24.

When the protruding of the outlet pipe 14 is locked to the lock groove 121 of the expansion pipe 12, the outlet pipe 14 can not easily get off, so that the expansion pipe 12 is kept in radially expanding condition (the equivalent diameter of the expanding expansion pipe 12 assembled to the first sealing ring is larger than the diameter of the hole 240 of the separating wall 24 of the toilet 2) that it can not get off the separating wall 24. Meanwhile, the sealing protruding 110 of the first sealing ring 11 is pressed, forming an end face sealing engagement with the expansion protruding 120 of the expansion pipe 12 to the separating wall 24 and the pipe type joint 14.

With above mentioned three sealing engagements, the quick-sealing connecting component 1 and the separating wall form a well sealing, so that the main waterway from the water source of the toilet 2 through the spraying waterway 23 to the spraying rear can not leak when pressure water gets through. Meanwhile, the second sealing ring 13 is configured between the expansion pipe 12 and the joint for sealing engagement. As the other end of the pipe type joint is connected to the water flexible pipe in sealing engagement, the main waterway can not leak when pressure water runs through or the pipe type joint 14 is lower than the water seal of the toilet 2.

To maintain above component, it only needs to pull the check valve hard, the protruding 140 of the pipe type joint 14 shrinks inwardly and gets off the lock groove 121, so that the quick-seal connecting component 1 can be easily taken out.

The Third Embodiment

Figure 7:
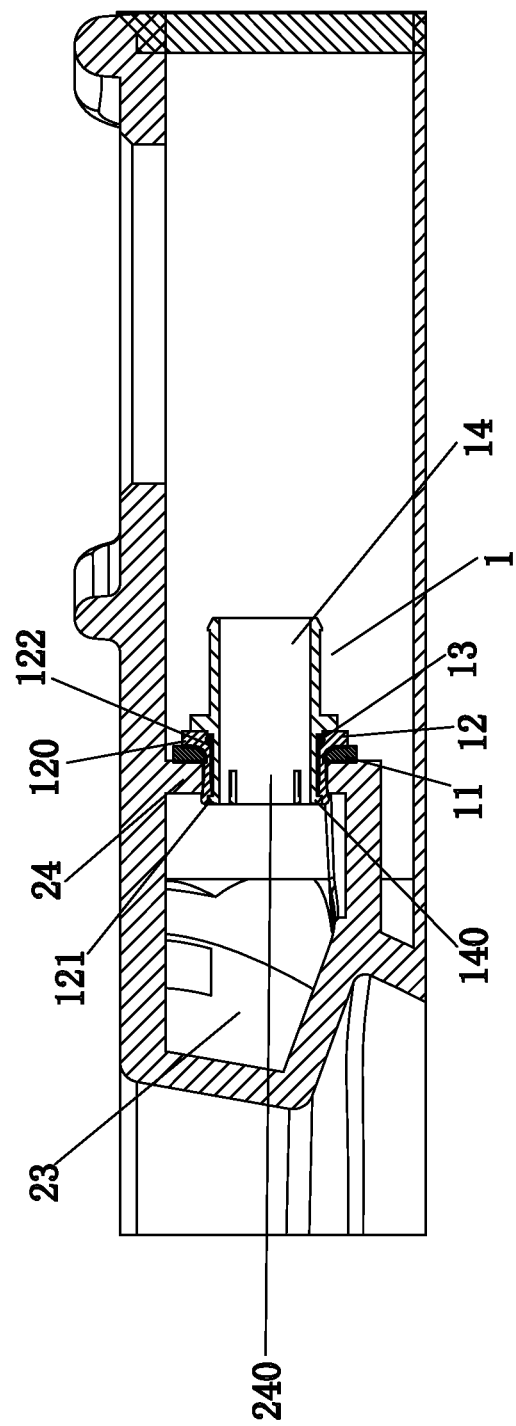
FIG. 7 illustrates a sectional diagram of the assembly structure of a third embodiment of the present invention.

As figured in FIG. 7, this embodiment needs that the main waterway from the water source of the toilet 2 through the spraying waterway 23 to the spraying rear can not leak when pressure water gets through. The quick-seal connecting component is assembled to the hole 240 of the separating wall 24 of the spraying waterway 23 of the toilet 2.

The quick-seal connecting component 1 of this embodiment comprises a first sealing ring 11, an expansion pipe 12, a second sealing ring 13 and a pipe type joint 14 with front and rear running throughout. The first sealing ring 11 is ring sealing ring, the head end of the expansion pipe 12 is disposed with a radial outward expansion protruding 120.

The pipe type joint 14 is assembled to the hole 240 of the separating wall 24 by the first sealing ring 11, the expansion pipe 12 and the second sealing ring 13, the expansion pipe 12 is sleeved on the outer wall of the outlet pipe 14, the first sealing ring 11 is sleeved on the outer wall of the expansion pipe 12, the second sealing ring 13 is sleeved between the expansion pipe 12 and the outlet pipe 14. Therein, the largest external diameter of the part of the first sealing ring 11 sleeved on the hole 240 of the separating wall 24 is larger than the internal diameter of the hole 240 of the separating wall 24; the largest external diameter of the part of the expansion pipe 12 sleeved on the sealing ring is larger than the smallest internal diameter of the first sealing ring 11; the end of the outlet pipe 14 is configured with a radial outward protruding 140, the end of the inner wall of the expansion pipe 12 is configured with a lock groove 121 coupled to the protruding 140, the head end of the expansion pipe 12 is disposed with a guiding surface 122 to guide the protruding 140.

The first sealing ring 11 is sleeved with the expansion pipe 12, the expansion pipe 12 and the first sealing ring 11 are assembled to the hole 240 of the separating wall 24, then the pipe type joint 14 is pressed, the protruding 140 of the pipe type joint 14 pushes the guiding surface 122 of the expansion pipe 12 to make the expansion pipe 12 expand outwardly, when the protruding 140 of the outlet pipe 14 is locked to the lock groove 121 of the expansion pipe 12, the outlet pipe 14 can not easily get off, so that the expansion pipe 12 is kept in radially expanding condition (the equivalent diameter of the expanding expansion pipe 12 assembled to the first sealing ring is larger than the diameter of the hole 240 of the separating wall 24 of the toilet 2) that it can not get off the separating wall 24. Meanwhile, the first sealing ring 11 is pressed, forming a sealing engagement with the expansion protruding 120 of the expansion pipe 12 to the separating wall 24 and the pipe type joint 14.

With above mentioned structure, the quick-sealing connecting component 1 and the separating wall form a well sealing, so that the main waterway from the water source of the toilet 2 through the spraying waterway 23 to the spraying rear can not leak when pressure water gets through. Meanwhile, the second sealing ring 13 is configured between the expansion pipe 12 and the joint for sealing engagement. As the other end of the pipe type joint is connected to the water flexible pipe in sealing engagement, the main waterway can not leak when pressure water runs through or the pipe type joint 14 is lower than the water seal of the toilet 2.

To maintain above component, it only needs to pull the check valve hard, the protruding 140 of the outlet pipe 14 shrinks inwardly and gets off the lock groove 121, so that the quick-seal connecting component 1 of the present invention can be easily taken out.

The Fourth Embodiment

Figure 8:
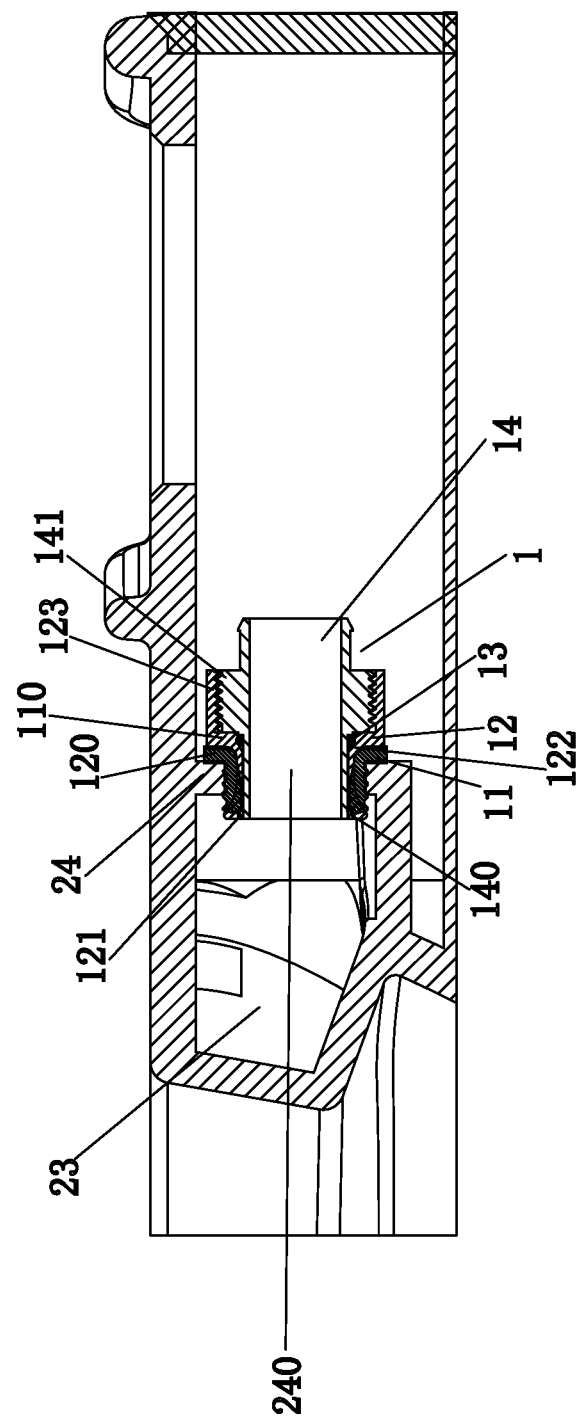
FIG. 8 illustrates a sectional diagram of the assembly structure of a fourth embodiment of the present invention.

As figured in FIG. 8, this embodiment needs that the main waterway from the water source of the toilet 2 through the spraying waterway 23 to the spraying rear can not leak when pressure water gets through. The quick-seal connecting component is assembled to the hole 240 of the separating wall 24 of the spraying waterway 23 of the toilet 2.

The quick-seal connecting component 1 of this embodiment comprises a first sealing ring 11, an expansion pipe 12, a second sealing ring 13 and a pipe type joint 14 with front and rear running throughout. The first sealing ring 11 is cylindrical sealing ring, the head end is disposed with a radial outward sealing protruding 110; the outer wall of the pipe joint 14 is disposed with male thread 141; the head end of the expansion pipe 12 is disposed with a radial outward expansion protruding 120, the inner wall of the end thereof is disposed with female thread 123 coupled to the male thread 141.

The pipe type joint 14 is assembled to the hole 240 of the separating wall 24 by the first sealing ring 11, the expansion pipe 12 and the second sealing ring 13, the expansion pipe 12 is sleeved on the outer wall of the outlet pipe 14, the first sealing ring 11 is sleeved on the outer wall of the expansion pipe 12, the second sealing ring 13 is sleeved between the expansion pipe 12 and the outlet pipe 14. Therein, the largest external diameter of the part of the first sealing ring 11 sleeved on the hole 240 of the separating wall 24 is larger than the internal diameter of the hole 240 of the separating wall 24; the largest external diameter of the part of the expansion pipe 12 sleeved on the sealing ring is larger than the smallest internal diameter of the first sealing ring 11; the end of the outlet pipe 14 is configured with a radial outward protruding 140, the end of the inner wall of the expansion pipe 12 is configured with a lock groove 121 coupled to the protruding 140, the head end of the expansion pipe 12 is disposed with a guiding surface 122 to guide the protruding 140.

The first sealing ring 11 is slightly interference fitted to the hole 240 of the separating wall 24 after assembled to the hole 240 of the separating wall 24. The expansion pipe 12 is sleeved in, so that the first sealing ring 11 is radially expanded and then compressed. The outlet pipe 14 is then pressed, the protruding 140 of the outlet pipe 14 pushes the guiding surface 122 of the expansion pipe 12 so that the expansion pipe 12 is expanded outwardly, and the first sealing ring 11 is then radially expanded and pressed on the wall of the opening 240 of the separating wall 24 of the toilet, forming a wall surface sealing engagement.

The expansion pipe 12 is radially expanded, the equivalent diameter thereof coupled to the first sealing ring 11 is larger than the external diameter of the hole 240 of the separating wall 24, so that the expansion pipe can not get off the separating wall 24. the first sealing ring 11 is radially expanded, the sealing protruding 110 thereof is pressed by the expansion protruding 120 and then pressed on the separating wall 24, forming a sealing engagement to the edge of the hole 240 of the separating wall 24.

When the protruding of the outlet pipe 14 is locked to the lock groove 121 of the expansion pipe 12, the outlet pipe 14 can not easily get off, so that the expansion pipe 12 is kept in radially expanding condition (the equivalent diameter of the expanding expansion pipe 12 assembled to the first sealing ring is larger than the diameter of the hole 240 of the separating wall 24 of the toilet 2) that it can not get off the separating wall 24. Meanwhile, the sealing protruding 110 of the first sealing ring 11 is pressed, forming a sealing engagement with the expansion protruding 120 of the expansion pipe 12 to the separating wall 24 and the pipe type joint 14.

With above mentioned structure, the quick-sealing connecting component 1 and the separating wall form a well sealing, so that the main waterway from the water source of the toilet 2 through the spraying waterway 23 to the spraying rear can not leak when pressure water gets through. Meanwhile, the second sealing ring 13 is configured between the expansion pipe 12 and the joint for sealing engagement. As the other end of the pipe type joint 14 is connected to the water flexible pipe in sealing engagement, the main waterway will not leak when pressure water runs through or the pipe type joint 14 is lower than the water seal of the toilet 2.

To maintain above component, it only needs to rotate the joint hard, the male thread 141 of the pipe type joint 14 rotatally get off the female thread 123 of the expansion pipe 12, the protruding 140 of the outlet pipe 14 shrinks inwardly and gets off the lock groove 121, so that the quick-seal connecting component 1 can be easily taken out.

The Fifth Embodiment

Figure 9:
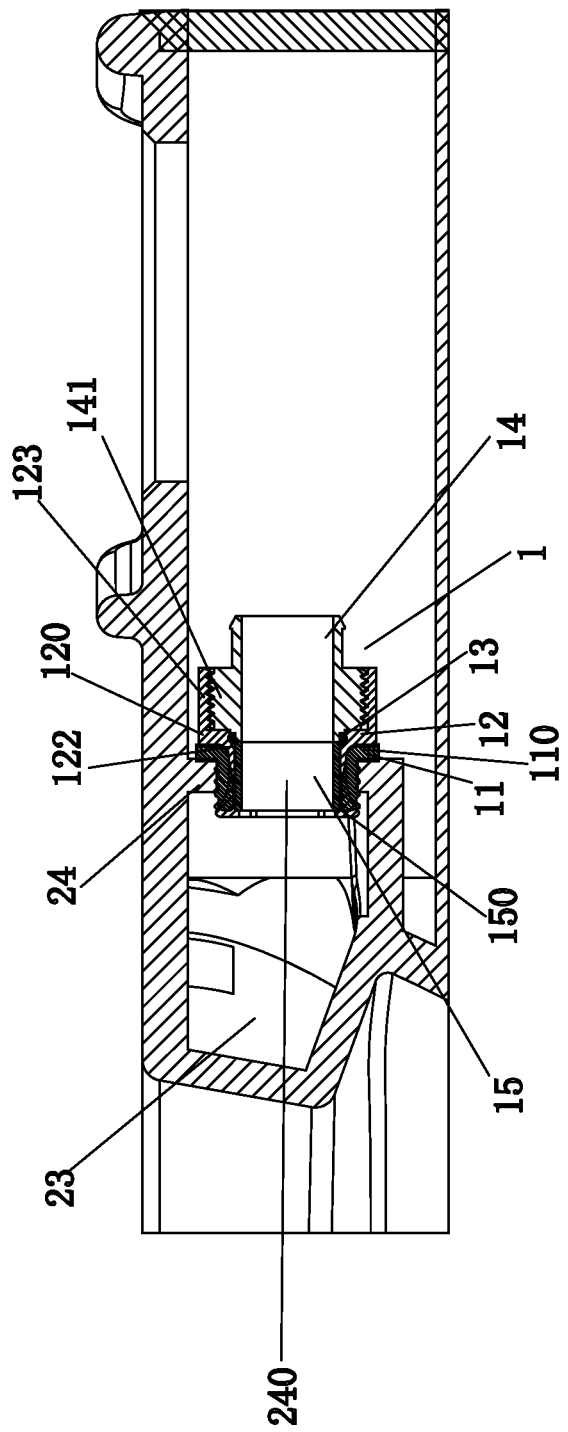
FIG. 9 illustrates a sectional diagram of the assembly structure of a fifth embodiment of the present invention.

As figured in FIG. 9, this embodiment needs that the main waterway from the water source of the toilet 2 through the spraying waterway 23 to the spraying rear can not leak when pressure water gets through. The quick-seal connecting component is assembled to the hole 240 of the separating wall 24 of the spraying waterway 23 of the toilet 2.

The quick-seal connecting component 1 of this embodiment comprises a first sealing ring 11, an expansion pipe 12, a second sealing ring 13, a pressing ring 15 and a pipe type joint 14 with front and rear running throughout. The first sealing ring 11 is cylindrical sealing ring, the head end is disposed with a radial outward sealing protruding 110; the outer wall of the pipe joint 14 is disposed with male thread 141; the head end of the expansion pipe 12 is disposed with a radial outward expansion protruding 120, the inner wall of the end thereof is disposed with female thread 123 coupled to the male thread 141.

The pipe type joint 14 is assembled to the hole 240 of the separating wall 24 by the first sealing ring 11, the second sealing ring 13, the expansion pipe 12 and the pressing ring 15, the expansion pipe 12 is sleeved on the outer wall of the outlet pipe 14 and the pressing ring 15, the first sealing ring 11 is sleeved on the outer wall of the expansion pipe 12, the second sealing ring 13 is sleeved between the expansion pipe 12 and the outlet pipe 14. Therein, the largest external diameter of the part of the first sealing ring 11 sleeved on the hole 240 of the separating wall 24 is larger than the internal diameter of the hole 240 of the separating wall 24; the largest external diameter of the part of the expansion pipe 12 sleeved on the sealing ring is larger than the smallest internal diameter of the first sealing ring 11; the pressing ring 15 is disposed with an inclined surface 150, the head end of the expansion pipe 12 is disposed with a guiding surface 122 to guide the inclined surface 150 of the pressing ring 15.

The first sealing ring 11 is slightly interference fitted to the hole 240 of the separating wall 24 after assembled to the hole 240 of the separating wall 24. The expansion pipe 12 is sleeved in, so that the first sealing ring 11 is radially expanded and then compressed. The pressing ring 15 is then pressed and the pipe type joint 14 is then threaded, the outlet pipe 14 pushes the pressing ring 15 so that the inclined surface 150 of the pressing ring 15 pushes the guiding surface 122 of the expansion pipe 12 to make the expansion pipe 12 expand outwardly, and the first sealing ring 11 is then radially expanded and pressed on the wall of the opening 240 of the separating wall 24 of the toilet, forming a sealing engagement.

The expansion pipe 12 is radially expanded, the equivalent diameter thereof coupled to the first sealing ring 11 is larger than the external diameter of the hole 240 of the separating wall 24, so that the expansion pipe can not get off the separating wall 24. the first sealing ring 11 is radially expanded, the sealing protruding 110 thereof is pressed by the expansion protruding 120 and then pressed on the separating wall 24, forming a sealing engagement to the edge of the hole 240 of the separating wall 24.

When the male thread 141 of the pipe type joint 14 is threaded to the female thread 123 of the expansion pipe 12, the expansion pipe 12 is kept in radially expanding condition (the equivalent diameter of the expanding expansion pipe 12 assembled to the first sealing ring is larger than the diameter of the hole 240 of the separating wall 24 of the toilet 2) that it can not get off the separating wall 24. Meanwhile, the sealing protruding 110 of the first sealing ring 11 is pressed, forming a sealing engagement with the expansion protruding 120 of the expansion pipe 12 to the separating wall 24 and the pipe type joint 14.

With above mentioned structure, the quick-sealing connecting component 1 and the separating wall form a well sealing, so that the main waterway from the water source of the toilet 2 through the spraying waterway 23 to the spraying rear will not leak when pressure water gets through. Meanwhile, the second sealing ring 13 is configured between the expansion pipe 12 and the joint for sealing engagement. As the other end of the pipe type joint is connected to the water flexible pipe in sealing engagement, the main waterway can not leak when pressure water runs through or the pipe type joint 14 is lower than the water seal of the toilet 2.

To maintain above component, it only needs to rotate and pull the joint hard, the male thread 141 of the pipe type joint 14 rotatally get off the female thread 123 of the expansion pipe 12, so that the quick-seal connecting component 1 can be easily taken out.

The component of the embodiments is not only applicable in sealing of the waterways of the toilets, but also applicable in products that need to separate waterways (airways) or other ways from the outside.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention provides a connecting component that the pipe type joint thereof is assembled to the pipe by a first sealing ring and an expansion pipe, it can realize quick-assembly of the sealing structure in a small space with high work efficiency and well sealing effect, it also realizes separating of the main waterway of the toilet and the outside air.

The invention claimed is:

1. A quick-seal connecting component, wherein comprising:
   a first sealing ring;
   an expansion pipe; and
   a joint pipe;
   the joint pipe is assembled to form an end face seal with the first sealing ring and the expansion pipe, the expansion pipe is sleeved on an outer wall of the joint pipe, the first sealing ring is sleeved on an outer wall of the expansion pipe;
   a head end of the first sealing ring has a first radial protrusion;
   a head end of the expansion pipe is provided with a second radial protrusion; and
   the first and second radial protrusions are compressively coupled together axially to form the end face seal, wherein
   the joint pipe is provided with a third radial protrusion, and
   an inner wall of the expansion pipe is provided with a lock groove coupled to the third radial protrusion.

2. The quick-seal connecting component according to claim 1, wherein a second sealing ring is further sleeved between the expansion pipe and the joint pipe.

3. The quick-seal connecting component according to claim 2, wherein a largest external diameter of the part of the expansion pipe sleeved in the first sealing ring is larger than the smallest internal diameter of the first sealing ring.

4. The quick-seal connecting component according to claim 1, further comprising a pressing ring, the expansion pipe is sleeved on the outer wall of the pressing ring.

5. The quick-seal connecting component according to claim 4, wherein a second sealing ring is disposed and sleeved between the expansion pipe and the joint pipe.

6. The quick-seal connecting component according to claim 5, wherein a largest external diameter of the part of the expansion pipe sleeved in the first sealing ring is larger than the smallest internal diameter of the first sealing ring.

7. The quick-seal connecting component according to claim 6, wherein the outer wall of the joint pipe is disposed with male thread, the inner wall of the expansion pipe is disposed with female thread that is coupled to the male thread of the outer wall of the joint pipe.

8. The quick-seal connecting component according to claim 4, wherein the joint pipe is disposed with an inclined surface, the head end of the expansion pipe is disposed with a guiding surface to guide the inclined surface of the joint pipe.

9. A quick-seal connecting component, comprising:
   a first sealing ring;
   an expansion pipe; and
   a joint pipe;
   the joint pipe is assembled to form an end face seal with the first sealing ring and the expansion pipe, the expansion pipe is sleeved on an outer wall of the joint pipe, the first sealing ring is sleeved on an outer wall of the expansion pipe;
   a head end of the first sealing ring has a first radial protrusion;
   a head end of the expansion pipe is provided with a second radial protrusion; and
   the first and second radial protrusions are compressively coupled together axially to form the end face seal,
   wherein a second sealing ring is further sleeved between the expansion pipe and the joint pipe,
   wherein a largest external diameter of the part of the expansion pipe sleeved in the first sealing ring is larger than the smallest internal diameter of the first sealing ring,
   wherein the outer wall of the joint pipe is disposed with male thread, the inner wall of the expansion pipe is disposed with female thread that is coupled to the male thread of the outer wall of the joint pipe.

10. The quick seal connecting component according to claim 9, wherein
    the joint pipe is provided with a third radial protrusion, and
    the inner wall of the expansion pipe is provided with a lock groove coupled to the third radial protrusion.

* * * * *